United States Patent [19]

Lien et al.

[11] Patent Number: 4,933,930
[45] Date of Patent: Jun. 12, 1990

[54] HIGH SPEED SWITCH AS FOR AN OPTICAL COMMUNICATION SYSTEM

[75] Inventors: Yeong-Chang Lien, Armonk; Roch A. Guerin, Yorktown Heights, both of N.Y.

[73] Assignee: International Business Machines Corporation, Armonk, N.Y.

[21] Appl. No.: 264,430

[22] Filed: Oct. 31, 1988

[51] Int. Cl.$^5$ .............................................. H04J 13/00
[52] U.S. Cl. .......................................... 370/18; 370/93
[58] Field of Search ....................... 370/18, 60, 94, 93, 370/95; 375/1

[56] References Cited

U.S. PATENT DOCUMENTS

| | | | |
|---|---|---|---|
| 3,715,508 | 2/1973 | Blasbalg | 370/18 |
| 4,281,409 | 7/1981 | Schneider | 370/18 |
| 4,475,186 | 10/1984 | Gutleber | 370/18 |
| 4,494,228 | 1/1985 | Gutleber | 370/18 |
| 4,740,959 | 4/1988 | Kosugi et al. | 370/95 |
| 4,779,265 | 10/1988 | O'Connor et al. | 370/18 |

FOREIGN PATENT DOCUMENTS

2174577 11/1986 United Kingdom .................. 370/18

OTHER PUBLICATIONS

Nishikado et al., "A New Encoding and Decoding Schemes for Multiple Acess Channels", The Transactions of the IECE of Japan, vol. E61, No. 4, Apr. 1978.
Schneider, "Optimum Detection of Code Division Multiplexed Signals", IEEE Transactions on Aerospace and Electronic Systems, vol. AES-15, No. 1, Jan. 1979.
Coding for T-User Multiple Access Channels, Chang et al., (pp. 684-691), IEEE Trans. on Information Theory, vol. IT25, No. 6, Nov. 1979.

*Primary Examiner*—Douglas W. Olms
*Assistant Examiner*—Alpus H. Hsu
*Attorney, Agent, or Firm*—Ratner & Prestia

[57] ABSTRACT

In a data communication network the routing of data items from a group of eight source processors to a group of eight destination processors is controlled by code values assigned to each of the data values. The data items to be routed are bit-serial binary signals. These are encoded by the source processor using a pair of code values, one for each value of a bit of the binary signal. The eight source processors each encode eight bit-serial signals using respectively different code tables. The code tables are generated as different permutations of a basic code set. Each code table has the property that any additive combination of encoded values for all of the data items in a group produces a unique sum. The eight encoded values produced by each processor are summed to produce a set of analog channel symbols that are transmitted over an analog channel to a central switch fabric. In the switch fabric, the channel symbols are partially decoded to recover the encoded data values. The data values are regrouped according to their destination processors and summed to produce further sets of channel symbols which are transmitted to the destination processors. At the destination processors, the data values are completely decoded and assigned to separate input terminals of the destination processors based on their source processor.

10 Claims, 9 Drawing Sheets

FIG. 1

FIG. 2 INPUT INTERFACE 112

FIG. 3A

| i | $X_i = 1$ | | | | | | | | $Y_i = 0$ | | | | | | | |
|---|---|---|---|---|---|---|---|---|---|---|---|---|---|---|---|---|
| 1 | 1 | 0 | 0 | 0 | 0 | 0 | 0 | 0 | 0 | 0 | 0 | 0 | 0 | 0 | 0 | 0 |
| 2 | 0 | 1 | 0 | 0 | 0 | 0 | 0 | 0 | 0 | 0 | 0 | 0 | 0 | 0 | 0 | 0 |
| 3 | 0 | 0 | 1 | 0 | 0 | 0 | 0 | 0 | 0 | 0 | 0 | 0 | 0 | 0 | 0 | 0 |
| 4 | 0 | 0 | 0 | 1 | 0 | 0 | 0 | 0 | 0 | 0 | 0 | 0 | 0 | 0 | 0 | 0 |
| 5 | 0 | 0 | 0 | 0 | 1 | 0 | 0 | 0 | 0 | 0 | 0 | 0 | 0 | 0 | 0 | 0 |
| 6 | 0 | 0 | 0 | 0 | 0 | 1 | 0 | 0 | 0 | 0 | 0 | 0 | 0 | 0 | 0 | 0 |
| 7 | 0 | 0 | 0 | 0 | 0 | 0 | 1 | 0 | 0 | 0 | 0 | 0 | 0 | 0 | 0 | 0 |
| 8 | 0 | 0 | 0 | 0 | 0 | 0 | 0 | 1 | 0 | 0 | 0 | 0 | 0 | 0 | 0 | 0 |

FIG. 3B

| i | $X_i = 1$ | | | | $Y_i = 0$ | | | |
|---|---|---|---|---|---|---|---|---|
| 1 | 1 | 1 | 1 | 1 | 0 | 0 | 0 | 0 |
| 2 | 1 | 0 | 1 | 0 | 0 | 1 | 0 | 1 |
| 3 | 1 | 0 | 1 | 0 | 0 | 0 | 0 | 0 |
| 4 | 1 | 1 | 0 | 0 | 0 | 0 | 1 | 1 |
| 5 | 1 | 0 | 0 | 1 | 0 | 1 | 1 | 0 |
| 6 | 1 | 0 | 0 | 0 | 0 | 0 | 1 | 0 |
| 7 | 1 | 0 | 0 | 0 | 0 | 0 | 0 | 0 |
| 8 | 0 | 1 | 0 | 0 | 0 | 0 | 0 | 0 |

FIG. 4

FIG. 4A    SWITCH FABRIC 116

CODE ASSIGNMENT FOR EIGHT INPUT INTERFACES

|  | INPUT INT. (112) #1 | INPUT INT. (120) #2 | INPUT INT. #3 | INPUT INT. #4 | INPUT INT. #5 | INPUT INT. #6 | INPUT INT. #7 | INPUT INT. (126) #8 |
|---|---|---|---|---|---|---|---|---|
| Input #1 | (X1,Y1) | (X2,Y2) | (X3,Y3) | (X4,Y4) | (X5,Y5) | (X6,Y6) | (X7,Y7) | (X8,Y8) |
| Input #2 | (X2,Y2) | (X3,Y3) | (X4,Y4) | (X5,Y5) | (X6,Y6) | (X7,Y7) | (X8,Y8) | (X1,Y1) |
| Input #3 | (X3,Y3) | (X4,Y4) | (X5,Y5) | (X6,Y6) | (X7,Y7) | (X8,Y8) | (X1,Y1) | (X2,Y2) |
| Input #4 | (X4,Y4) | (X5,Y5) | (X6,Y6) | (X7,Y7) | (X8,Y8) | (X1,Y1) | (X2,Y2) | (X3,Y3) |
| Input #5 | (X5,Y5) | (X6,Y6) | (X7,Y7) | (X8,Y8) | (X1,Y1) | (X2,Y2) | (X3,Y3) | (X4,Y4) |
| Input #6 | (X6,Y6) | (X7,Y7) | (X8,Y8) | (X1,Y1) | (X2,Y2) | (X3,Y3) | (X4,Y4) | (X5,Y5) |
| Input #7 | (X7,Y7) | (X8,Y8) | (X1,Y1) | (X2,Y2) | (X3,Y3) | (X4,Y4) | (X5,Y5) | (X6,Y6) |
| Input #8 | (X8,Y8) | (X1,Y1) | (X2,Y2) | (X3,Y3) | (X4,Y4) | (X5,Y5) | (X6,Y6) | (X7,Y7) |

FIG. 8

| i | Xi = 1 | | Yi = 0 | |
|---|--------|--------|--------|--------|
| 1  | 1 1 1 1 | 0 0 0 0 | 0 0 0 0 | 0 0 0 0 |
| 2  | 1 0 1 0 | 0 0 0 0 | 0 1 0 1 | 0 0 0 0 |
| 3  | 1 0 1 0 | 0 0 0 0 | 0 0 0 0 | 0 0 0 0 |
| 4  | 1 1 0 0 | 0 0 0 0 | 0 0 1 1 | 0 0 0 0 |
| 5  | 1 0 0 1 | 0 0 0 0 | 0 1 1 0 | 0 0 0 0 |
| 6  | 1 0 0 0 | 0 0 0 0 | 0 0 1 0 | 0 0 0 0 |
| 7  | 1 0 0 0 | 0 0 0 0 | 0 0 0 0 | 0 0 0 0 |
| 8  | 0 1 0 0 | 0 0 0 0 | 0 0 0 0 | 0 0 0 0 |
| 9  | 0 0 0 0 | 1 1 1 1 | 0 0 0 0 | 0 0 0 0 |
| 10 | 0 0 0 0 | 1 0 1 0 | 0 0 0 0 | 0 1 0 1 |
| 11 | 0 0 0 0 | 1 0 1 0 | 0 0 0 0 | 0 0 0 0 |
| 12 | 0 0 0 0 | 1 1 0 0 | 0 0 0 0 | 0 0 1 1 |
| 13 | 0 0 0 0 | 1 0 0 1 | 0 0 0 0 | 0 1 1 0 |
| 14 | 0 0 0 0 | 1 0 0 0 | 0 0 0 0 | 0 0 1 0 |
| 15 | 0 0 0 0 | 1 0 0 0 | 0 0 0 0 | 0 0 0 0 |
| 16 | 0 0 0 0 | 0 1 0 0 | 0 0 0 0 | 0 0 0 0 |

HIGH SPEED SWITCH AS FOR AN OPTICAL COMMUNICATION SYSTEM

BACKGROUND OF THE INVENTION

1. Field of the Invention

The present invention generally relates to telecommunications switching systems and more particularly, to a code division multiplexed switching system which uses multiple access codes to encode the data. In this system, path selection is performed, in part, by encoding and decoding systems associated with each node in the switch.

2. Description of the Prior Art

In recent years the computational power of data processing systems has increased very rapidly. In particular, there has been a marked increase in the use of multiple processing elements operating concurrently under control of a single program—or a suite of related programs—to solve a single problem. These processing elements may be located in close proximity, as in a tightly coupled processing environment, or they may be at distant locations, linked to each other through a complex data processing network. In systems of this type, communication of both data and control information among the processors is an important factor in determining the efficiency of the multiple processor system.

Traditionally, this interprocessor communication has been implemented by a switching system which is coupled to each processor and which includes a controller for routing data among the multiple processing elements. A switching system of this type, operating in a processing network that includes high performance processors, desirably includes a signal transmission medium having a wide bandwidth and a controller which can route data among the processors connected to the system quickly and in a manner that avoids conflicts among the processors for access to the available communications channels.

A fiber optic transmission medium has a bandwidth suitable for such a high performance processing network. However, the increase in bandwidth afforded by the use of a fiber optic transmission medium should be matched by a comparable increase in the processing speed of the switch controller. Otherwise, the overall efficiency of the switch will be less than is desirable for a high performance processing system. The coupling of switch controllers in order to increase the efficiency of the switching system is, however, a much more difficult task than the relatively simple coupling of transmission lines. In other words, the parallel processing of the switch routing commands is not as simple as the parallel transmission of data. Thus, the switch controller is likely to become a bottleneck in future high-speed switching facilities.

One way around this problem is to transfer some of the real-time control functions from the controller to other components of the switching system. In the limit, this approach would produce a self-routing switching system, that is to say, one without a controller. In a switching system of this type, message routing would be inherent in the design of the transmission components. A self-routing system of this type may be realized using code division multiple access (CDMA) techniques, as set forth below.

In the prior art, U.S. Pat. No. 3,715,508 to Blasbalg describes a switching circuit which uses a plurality of pseudo-random, mutually orthogonal code sequences to encode a plurality of messages. The encoded messages are linearly summed to generate a signal for transmission. The signals are decoded by a plurality of receivers, each of which arithmetically processes the summed message signal with a respective regenerated code. These codes are pseudo-random sequences, identical to those used encode the data. A final step in the decoding operation is to integrate the processed signals produced by each of the receivers. Since the codes are mutually orthogonal, each receiver will recover only one message from the summed message signal.

U.S. Pat. No. 4,475,186 to Gutleber describes a switching system which uses a plurality of pseudo-random code sequences to encode a plurality of messages. Each of these code sequences autocorrelates to a lobeless impulse function and, at the peak of the autocorrelation function, exibits zero crosscorrelation with each other code sequence of the plurality of code sequences. This property makes the code sequences mutually orthogonal. This switching system automatically directs a message applied to a specific input line to a selected output line which is matched to the code used on the specific input line.

SUMMARY OF THE INVENTION

It is an object of this invention to provide a high speed switching system for a multi-port data transmission system.

It is another object of this invention to provide a data encoding system for a multi-port data transmission system which associates a code, with each data item being transmitted, that uniquely identifies the desired source and destination.

It is a further object of the present invention to provide a high-speed switch for an N-port data transmission system which may be readily expanded to accommodate data transmission systems having more than N ports.

It is another object of the present invention to provide a multi-port data transmission system having a relatively high bandwidth efficiency.

In the present invention, a plurality of source processors or nodes are coupled to a central switching network for communicating with each of N destination processors or nodes. Circuitry in the switching system assigns code word for each different value of a datum which may be transmitted. The code words determine both the value of the datum and the destination processor that is to receive it. The code words produced in response to each of the plurality of source processors are then combined to generate a corresponding plurality of sets of channel symbols.

The combined code values are broken down into their constituent individual code words which are then recombined according to their destination processors. Each of the recombined code values for a particular destination processor, is a set of channel symbols representing a combination of data values from each of the source processors. These recombined code values are reduced, at an interface between the switching system and the destination processors, into their constituent code words. Each code word is associated with a corresponding source processor and applied to its respective destination processor.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE PREFERRED EMBODIMENT OF THE INVENTION

The described embodiment of the invention is in the context of a switching system for a computer network. This network is described below, first generally with reference to FIG. 1 and then in more detail with reference to FIGS. 2 through 8. In the network, eight processors, labeled A through H, each have input ports (destination nodes) and output ports (source nodes) coupled to the switching system so that any processor may communicate with any other processor. The output ports of three of the eight processors (A, B and H) are represented by the blocks 110, 118 and 124. The input ports of the processors A, B and H are represented by the blocks 134, 140 and 146. For the sake of brevity, only these three of the eight processors and their corresponding switch interfaces are described below.

Figure 1:
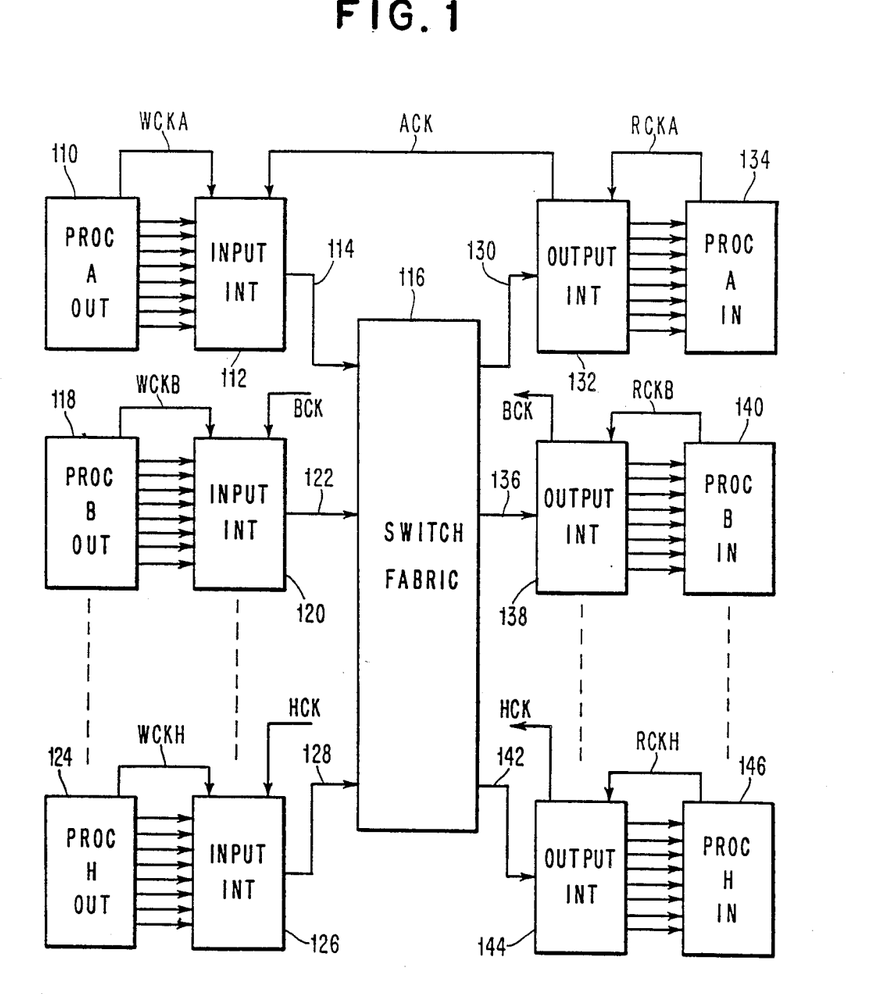
FIG 1 is a block diagram showing a switching system which includes an embodiment of the present invention.

The switching system shown in FIG. 1 includes input interface circuits 112, 120 and 126 which are coupled to the respective output ports 110, 118 and 124. Each input interface used in this exemplary embodiment of the invention, encodes eight single bit values from eight respective bit-serial signals (one for each destination processor), provided by its associated processor output port, to develop eight basic encoded data values. These encoded data values are then additively combined into a sequence of N analog data values or channel symbols. In the two embodiments of the invention described below, N is less than or equal to eight.

The input interfaces 112, 120 and 126 are also coupled to receive clock signals ACK, BCK and HCK from the respective output interfaces 132, 138, 144, which in this embodiment of the invention are located in close proximity to their corresponding input interfaces. The clock signals ACK, BCK and HCK are generated, as set forth below, from a master clock signal, MCK, provided by the switch fabric 116. The input interfaces 112, 120 and 126 are also responsive to clock signals WCKA, WCKB and WCKH provided by the respective processor output ports 110, 118 and 124. These clock signals synchronize the input interfaces to their respective processor output ports.

The analog data sequences provided by the input interfaces 112, 120 and 126 are coupled to the switch fabric 116 via data channels 114, 122 and 128, respectively. The switch fabric 116 is a signal transmission network in which signals from the various source processors are regrouped and directed to their respective destination processors. In this embodiment of the invention, the data channels used in the switch fabric 116 are optical fibers. As set forth below, however, it is contemplated that other types of channels, for example, conventional electrical transmission lines, may be used in place of the optical fibers.

The switch fabric 116 partially decodes the sets of N channel symbols provided by the input interfaces 112, 120 and 126 to obtain the respective constituent basic encoded data values. These basic code values, each of which uniquely identifies its destination processor, are then grouped according to their destination processors. Each of the groups of values is additively combined to form an analog data sequence (i.e. a set of N channel symbols). These data sequences are of the same type as those formed by the input interfaces 112, 120 and 126. The data sequences developed by the switch fabric 116 are then directed to the output interfaces 132, 138 and 144 via the data channels 130, 136 and 142. The switch fabric 116 also resynchronizes the data in the sequences it receives so that the sequences it provides are timed in phase relative to a single internally generated clock signal.

Each of the output interfaces 132, 138 and 144 decodes the data sequences as they are received, first into the basic code values and then into the original bit-serial data signals. The decoded data signals generated by the output interfaces 132, 188 and 144 are applied to the respective processor input ports 134, 140 and 146. The output interfaces 132, 138 and 144 are responsive to respective clock signals RCKA, RCKB and RCKH to synchronize the bit-serial signals to the processor input ports 134, 140 and 146, respectively. As set forth above, the output interfaces 182, 188 and 144 also provide the clock signals ACK, BCK and HCK to the respective input interface circuits 112, 120 and 126.

The following is a more detailed description of the switching system.

Figure 2:
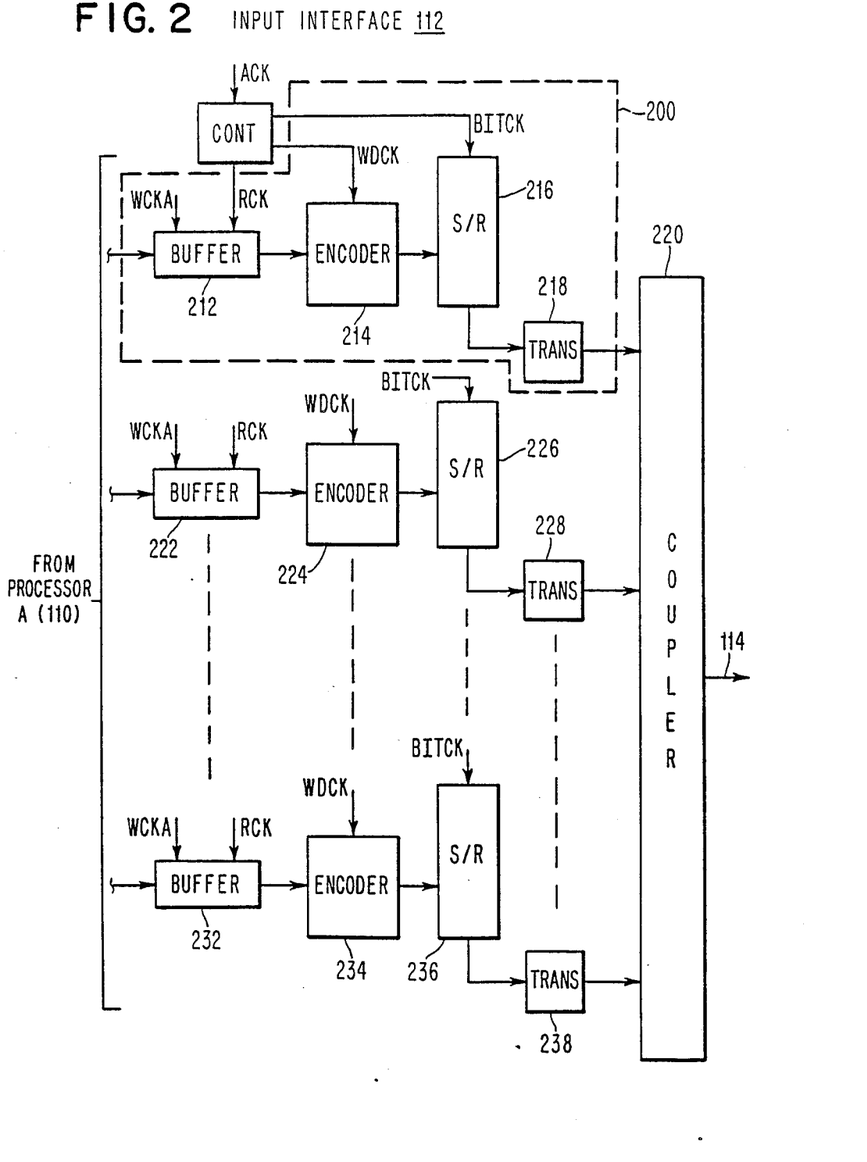
FIG. 2 is a block diagram of an input adapter suitable for use in the switching system shown in FIG. 1.

In an input interface circuit, eight bit-serial signals are simultaneously received from a corresponding processor output port, one bit-serial signal for each destination processor, assigned in a fixed order. In this embodiment of the invention, signals applied to the first input terminal are directed to destination processor A, those applied to the second input terminal, to destination processor B, and so on. These bit-serial signals are processed by separate processing stages in the input interface circuitry and then combined to form the analog data sequences provided by the input interface circuitry. FIG. 2 illustrates circuitry suitable for use as the one of the input interface circuits 112, 120 or 126. This circuitry is shown in the context of the circuit 112. In FIG. 2, only three of the eight processing stages are illustrated, and of these, only one, identified by the broken-line box 200, is described below.

The processing stage 200 includes four components: a buffer 212 which stores data to be sent to a particular destination processor; an encoder 214 which receives the bit-serial signal provided by the buffer and emits one of two codewords, depending on whether the received data bit is a zero or a one; a parallel-to-serial converter 216 which serializes the codewords; and a transmitter 218 which converts the data into a form suitable for transmission over the transmission channel. A coupler 220 additively combines the output signals of the eight processing stages of an input interface circuit to generate the analog data sequence (i.e. the set of channel symbols) which is applied to the transmission channel 114.

The buffer 212 operates as a single-bit first-in first-out memory (FIFO). The write clock signal for this memory is the signal WCKA provided by the processor output port 110 to which the input interface 112 is connected. The read clock signal, RCK, is synchronized to the signal ACK provided by the output interface 134. This clock signal is derived, by the output interface 132, from the master clock signal MCK generated by the switch fabric 116. Consequently, the signal RCK has a period which is substantially the same as that of the master clock signal, MCK. The buffer 212 provides a value of zero if an attempt is made to read data when the buffer is empty.

In FIG. 2, the clock signal RCK and the clock signals WDCK and BITCK are generated by controller circuitry 210. The signal WDCK is a phase-delayed version of the signal RCK and the signal BITCK is phase delayed with respect to the signal WDCK and has a frequency that is N times the frequency of the signal WDCK, where N is the number of channel symbols in the data sequence provided by the input interface circuit 112. The signal BITCK may be generated by conventional phase-locked-loop circuitry internal to the controller 210 or may be generated from the signal ACK if that signal is supplied at the same frequency as the signal BITCK. The signals RCK, WDCK and BITCK are applied to all eight processing stages of the input interface circuit.

The signal WDCK and the data values provided by the buffer 212 are applied to an encoder 214. Each of the encoders used in an input interface circuit is independent of all other encoders Each encoder is, in fact, a hard-wired selector which, for each pulse of the signal WDCK, provides one of two possible N-bit codewords, Xi or Yi, depending on whether the bit provided by the buffer 212 is a one or a zero, respectively. The code table from which the codewords are selected is described below in reference to FIGS. 3A and 3B.

The N-bit codewords provided by the encoder 214 are applied to the parallel-to-serial converter 216. The converter 216 may be, for example, an N-bit parallel-input, serial-output shift register. A codeword is loaded into the register 216 synchronous with the signal WDCK and is shifted out, bit by bit, synchronous with the signal BITCK. The bit-serial signal provided by the register 216 is applied to the transmitter circuit 218.

The transmitter 218 used in this embodiment of the invention is an ON/OFF type of transmitter. One unit of power is sent when a value of one is to be transmitted and no power is sent when a zero is to be transmitted. The type of transmitter used depends on the transmission medium selected for the channel 114 to the switch fabric 116. In this embodiment of the invention, optical fibers are used to couple signals from the input interfaces 112, 120 and 126 to the switch fabric 116. Consequently, the transmitter 218 is a light emitting diode (LED) or a laser diode. If conventional electrical transmission lines were used instead of the optical fibers, the transmitter 218 may be, for example, a current source (not shown).

The transmitter of each processing stage of the input interface circuit is connected to the coupler 220. The coupler 220 is a passive device (e.g. a conventional optical coupler or a resistor network) that additively combines the input signals and sends the combined signals to the switch fabric 116 via the transmission channel 114. During each period of the signal BITCK, the symbol being transmitted consists of M power units where M is the number of ones that were present at the input terminals of the various transmitters during the corresponding period of the signal BITCK.

The code sets used by the eight input interfaces of the switching system shown in FIG. 1 are various permutations of a single basic code set. The type of code used by this invention is defined as a multiple access code for an additive channel. Codes of this type have the property that an additive combination of K N-bit code values, representing a one or a zero on each of K input terminals of the input interface circuit, produces a unique sequence of N analog values. Each of these analog values is a channel symbol. This sequence of channel symbols may be used to unambiguously recover the original K N-bit code values. Exemplary basic code sets are illustrated in FIGS. 3A and 3B.

Figure 3A:
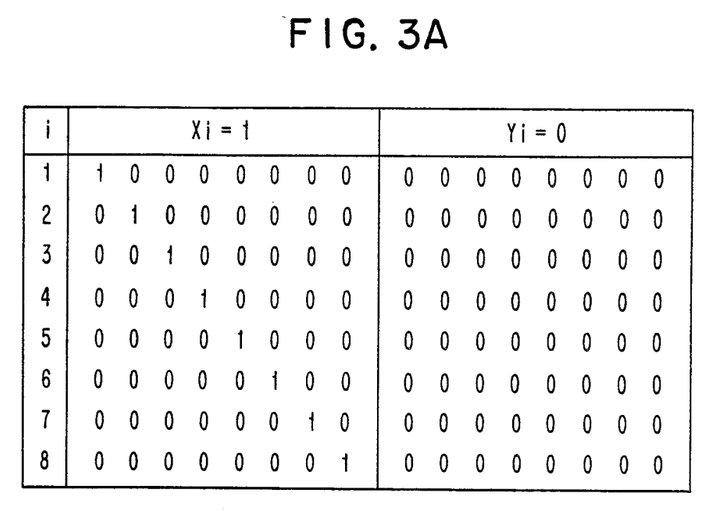
FIGS. 3A and 3B are tables illustrating code sets suitable for use by the input adapter shown in FIG. 2 to encode the data for transmission to the destination processors.

The code shown in FIG. 3A is the simplest possible multiple access code for an additive channel which may be used to encode eight input values. In FIG. 3A, K and N are both equal to eight. Each row of the table in FIG. 3A represents the two code values used by one of the encoders (e.g. 214, 224 or 234) of a particular input interface circuit. The eight rows represent the code pairs assigned to the respective eight processing stages of the input interface circuit. Each column of a side (i.e. Xi or Yi) of the table represents a time slot in the eight-value analog data sequence provided by the coupler 220.

The code table shown in FIG. 3A is essentially a time-division multiplexing of the transmission channel since each destination processor is allotted its own time slot in the eight-value sequence provided by the coupler 220. Thus, it is apparent that any combination of ones and zeros on the eight input terminals of the input interface circuit produces a unique sum value when the code shown in FIG. 3A is used.

Figure 3B:
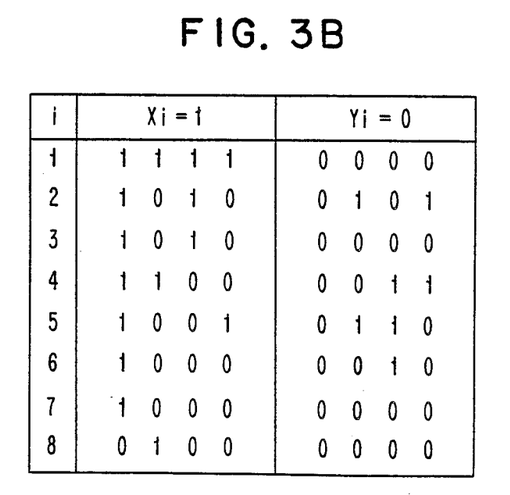

The code shown in FIG. 3B also has this property although it is not as apparent. This code has the same general format as the code shown in FIG. 3A except that N is equal to four, so each code value has only four bits. Consequently, the input interfaces provide analog sequences which include only four channel symbols. Since these data sequences are one-half the length of those generated by the code of FIG. 3A, a system using this code is twice as efficient as one using the code of FIG. 3A.

Figure 5:
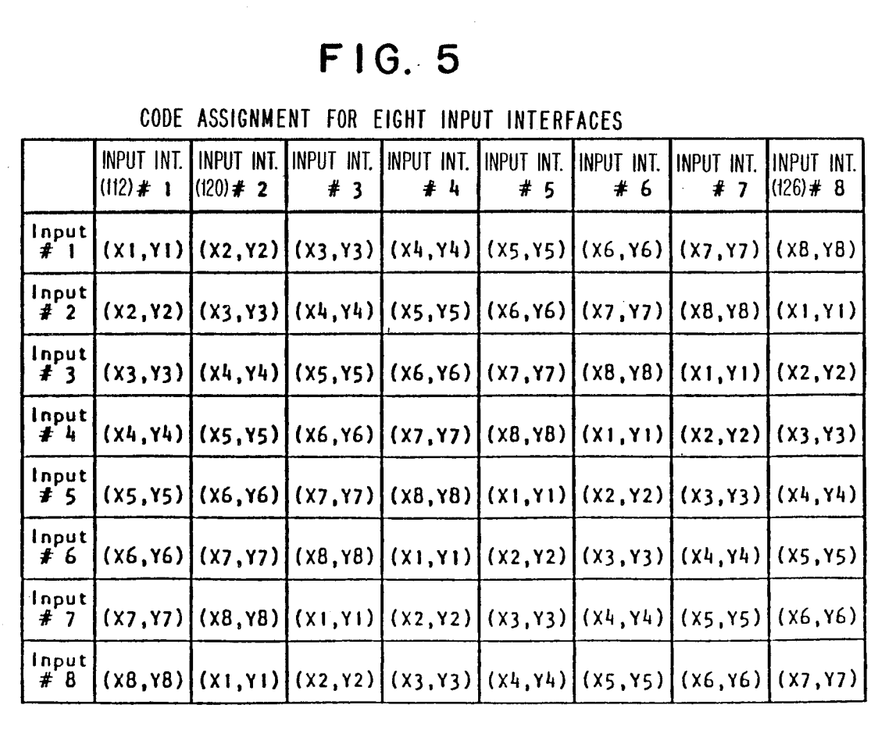
FIG. 5 is a table illustrating the permutation of the code shown in FIG. 3A or 3B to generate distinct code sets for the processors coupled to the switching system shown in FIG. 1.

As set forth above, the code tables shown in FIGS. 3A and 3B represent code values assigned to one of the eight input interface circuits of the switching system shown in FIG. 1. The code values assigned to each of the other input interfaces may be represented by permutations of the rows of the tables shown in FIGS. 3A and 3B. A table shown in FIG. 5 illustrates one possible set of permutations of the rows of either one of the tables of FIGS. 3A or 3B. This table illustrates suitable code values for all eight of the input interface circuits of the switching system shown in FIG. 1.

The set of permutations illustrated in FIG. 5 is desirable since a different code value is used by each input interface circuit to designate a message as being for a particular destination processor. In fact, the code set used by all of the source processors for any one of the destination processors includes all of the code values of the code table used by any of the input interface circuits. Consequently, an additive combination of basic code values from all eight of the input interface circuits for a given destination processor produces a unique sequence of N analog channel symbols. This property of the permutation table shown in FIG. 5 is used in the switch fabric circuitry 116, as set forth below, to unambiguously route the data signals provided by the various input interface circuits to their corresponding destination processors.

Figures 4, 4A:
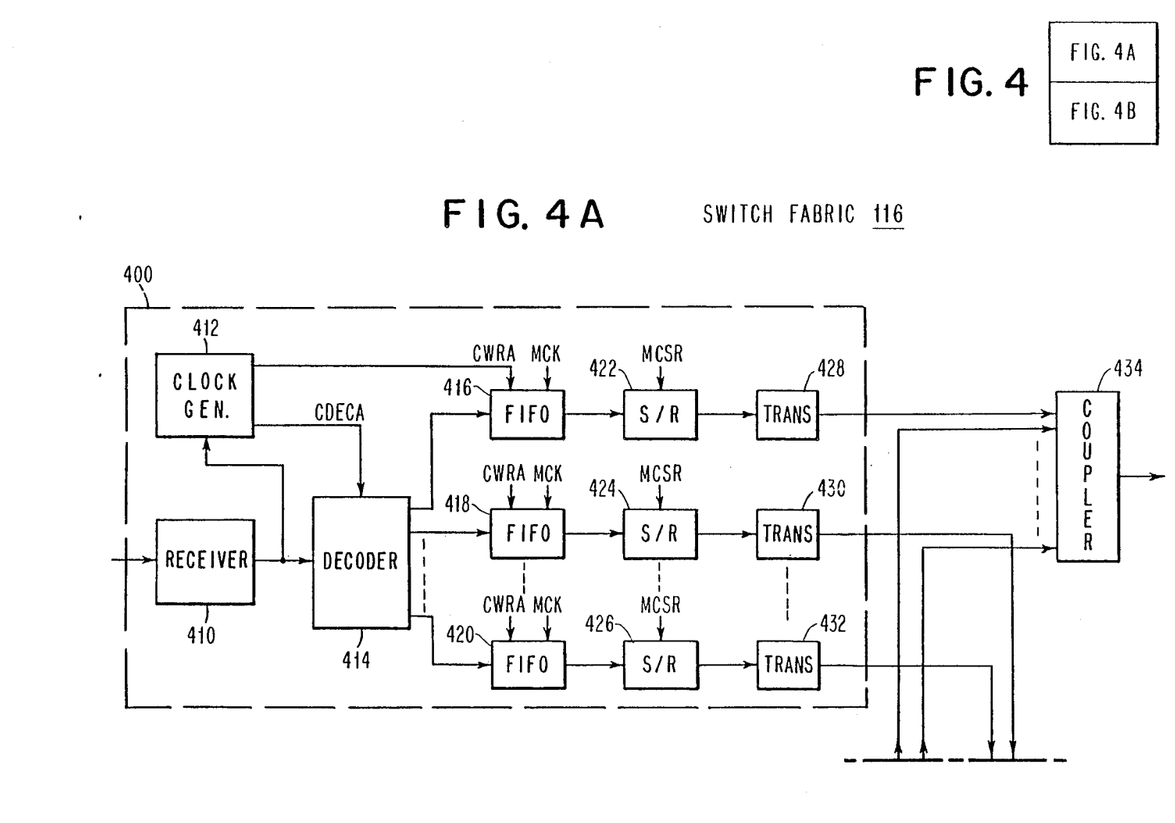
FIGS. 4, 4A and 4B are block diagrams illustrating the structure of the switch fabric used in the switching system shown in FIG. 1.
Figure 4B:
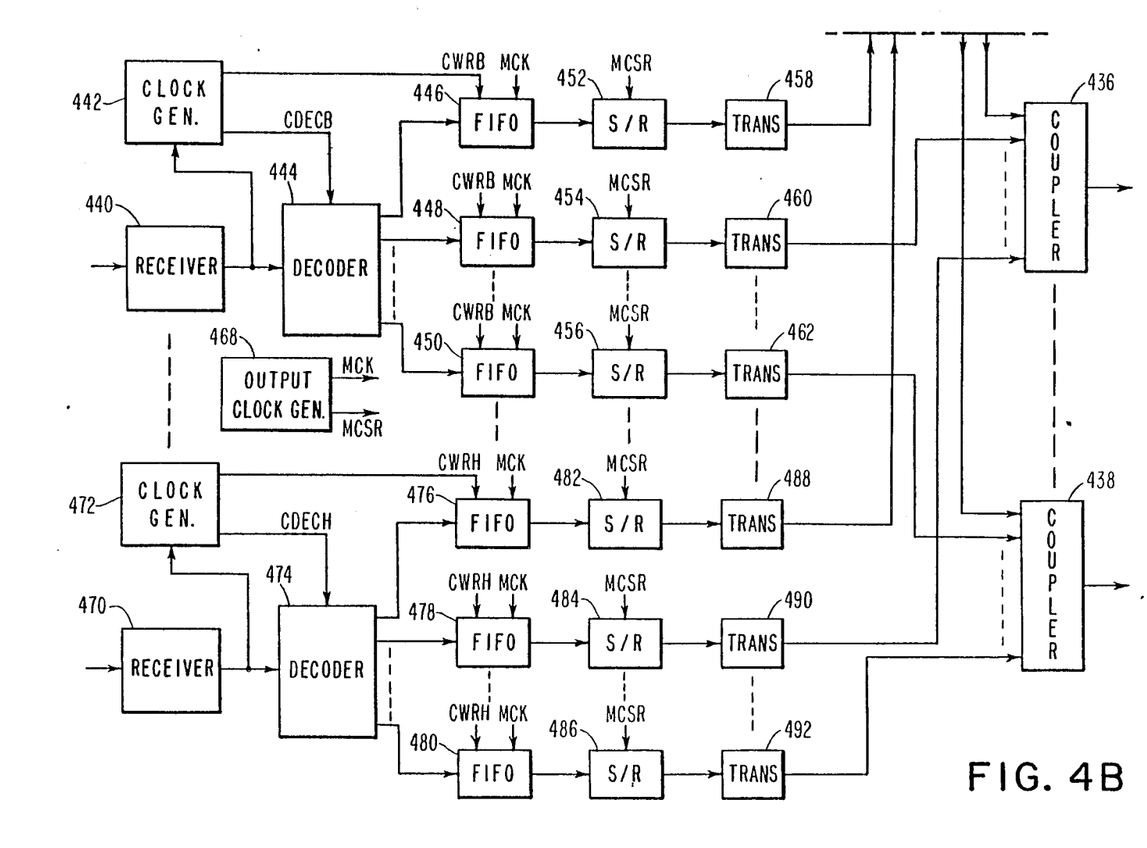

FIG. 4 is a block diagram of circuity suitable for use as the switch fabric 116. The switch fabric circuitry shown in FIG. 4 includes eight processing stages—one for each input interface circuit—of which, the first, second and eighth are shown. Except for the code table used by its decoder, the circuitry used in each of the eight stages is identical. Consequently, only the stage 400, delimited by the broken-line box, is described in detail.

The processing stage 400 includes a receiver 410, a decoder 414, eight N-bit wide FIFO's, eight parallel to serial converters, eight transmitters and a clock generation circuit 412. Only three of the FIFO's (416, 418 and 420), three of the parallel to serial converters (422, 424 and 426) and three of the transmitters (428, 430 and 432) are shown in the stage 400. In addition, the switch fabric circuitry 116 includes eight couplers, one for each output interface circuit, of which the first (434), second (436) and eighth (438) are shown. All of the output signals generated by the switch fabric 116 are synchronized to an internal clock signal generated by an output clock generation circuit 468.

Referring to FIG. 1, sequences of analog values provided by the respective input interface circuits 112, 120 and 126 are applied to the switch fabric via the transmission channels 114, 122 and 128, respectively. These transmission channels may have different lengths and so, the data sequences transmitted by the different input interface circuits may arrive at the switch fabric at different times. The data conveyed by the transmission channel 114 is applied to a receiver 410. If the transmission channel is an optical fiber, the receiver 410 includes a transducer (not shown) for converting light energy to an electrical current. Alternatively, if the transmission channel is an electrical transmission line, the receiver 410 includes circuitry (not shown) for terminating the transmission line and for amplifying the received signal to a level suitable for application to the decoder 414.

The electrical signals provided by the receiver 410 are applied to the decoder 414 and to the clock generator 412. The clock generator 412, which may include conventional phase locked loop (PLL) circuitry (not shown), generates a clock signal CDECA, that is synchronized to the data stream provided by the receiver 410, and a clock signal CWRA that is phase-shifted relative to the clock signal CDECA and has a frequency 1/N times that of the signal CDECA. Alternatively, the clock generator 412 may include a programmable phase shifter (not shown) and a frequency divider (not shown) and may derive the clock signals CDECA and CWRA from the master clock signal MCK provided by an output clock generator 468.

The decoder 414 used in this embodiment of the invention includes an analog-to-digital converter (ADO) (not shown), which converts the analog sequence of values provided by the receiver 410 into a digital sequence of values. These values are applied to a serial-to-parallel converter (not shown) which generates an address value for a read-only memory (ROM) (not shown). The ROM is programmed to translate the sequence of channel symbols provided via the channel 114 into its constituent basic code values. This is possible since, as set forth above, each sum of eight encoded input signals provided by the input interface 112 produces a distinct sequence of N channel symbols. The output terminals of the ROM are coupled to the FIFO circuits so that the codeword originally designated for processor A (134) is applied to FIFO 416, the codeword originally designated for processor B (140) is applied to FIFO 418 and the codeword originally designated for processor H (146) is applied to FIFO 420. Codewords designated for processors C through G are applied to FIFO's (not shown) located between FIFO 418 and FIFO 420.

Each of the FIFO's 416, 418 and 420 are responsive to the signal CWRA to store basic code values as they are provided by the decoder 414. These FIFO's are also responsive to the clock signal MCK, generated by the output clock generator 468, to provide N-bit code values to the parallel-to-serial converters 422, 424 and 426, respectively. Each of the converters 422, 424 and 426 is responsive to a signal MCSR to provide the codewords, bit-by-bit to the respective transmitters 428, 480 and 482. The signal MCSR is shifted in phase relative to the signal MCK and has a frequency N times that of the signal MCK.

The eight transmitters of the processing channel 400 are connected to respectively different ones of the eight couplers of the switch fabric. For example, the transmitter 428 provides its output signal to the coupler 434; the transmitter 430, to coupler 436; and the transmitter 432, to coupler 438. The transmitters of the other seven stages of the switch fabric are connected in the same manner, such that all code values destined for processor A (134) are applied to coupler 434, all code values destined for processor B (140) are applied to coupler 436 and all code values destined for processor H (146) are applied to coupler 438.

The switch fabric 116 does not actually perform any switching operation, it simply routes encoded data provided via transmission channels coupled to the input interfaces to transmission channels coupled to the output interfaces. The routing of a code value in the switch fabric is determined by the value of the code and by the input interface which generated it. This routing is effected by matching each decoder in the switch fabric to its corresponding input interface circuit. For example, the decoder 414 operates relative to the code table used by the input interface 112, the decoder 444 operates relative to the code table used by the input interface 120 and the decoder 474 operates relative to the code table used by the input interface 126.

None of these decoders completely decodes the data. They read the analog sum values provided by the input transmission channels, split the sum values into their constituent basic code values and direct the basic code values according to their original destination processors.

The couplers 434, 436 and 438 perform the same function as the couplers of the input interface circuits. They additively combine codewords to generate unique sequences of N analog values, where N is eight or four depending on whether the code tables are derived from the respective code sets shown in FIGS. 3A or 3B. The additive combination of code values destined for a particular processor produces a unique sequence of N values because the code values combined by each of the couplers of the switch fabric are the same as the codes used by the input interface circuits.

Referring to FIG. 5, each row of the code assignment table represents the code values designated for a particular destination processor by each of the source processors A through H. For example, the first row of the table contains the code values used by the the respective source processors A through H to send data to the destination processor A. The code represented by this row is the same as that represented by the first column of the table; the basic code set of FIG. 3A or FIG. 3B. The same relationship exists between the other rows and columns of the table shown in FIG. 5.

The signals applied to the output transmission channels 130, 136 and 142 are received by the output interfaces 132, 138 and 144, respectively. Each output interface breaks up the sequence of N channel symbols, received from the transmission channel, into eight N-bit code values; decodes each of the code values into a one or a zero; and applies the decoded values to corresponding input terminals of the input port of its associated destination processor. Each input terminal receives data provided by a respectively different source processor. In this embodiment of the invention, data applied to the first input terminal of the input port of each destination processor originated from source processor A, data applied to the second input terminal, from source processor B and so on.

Figure 6:
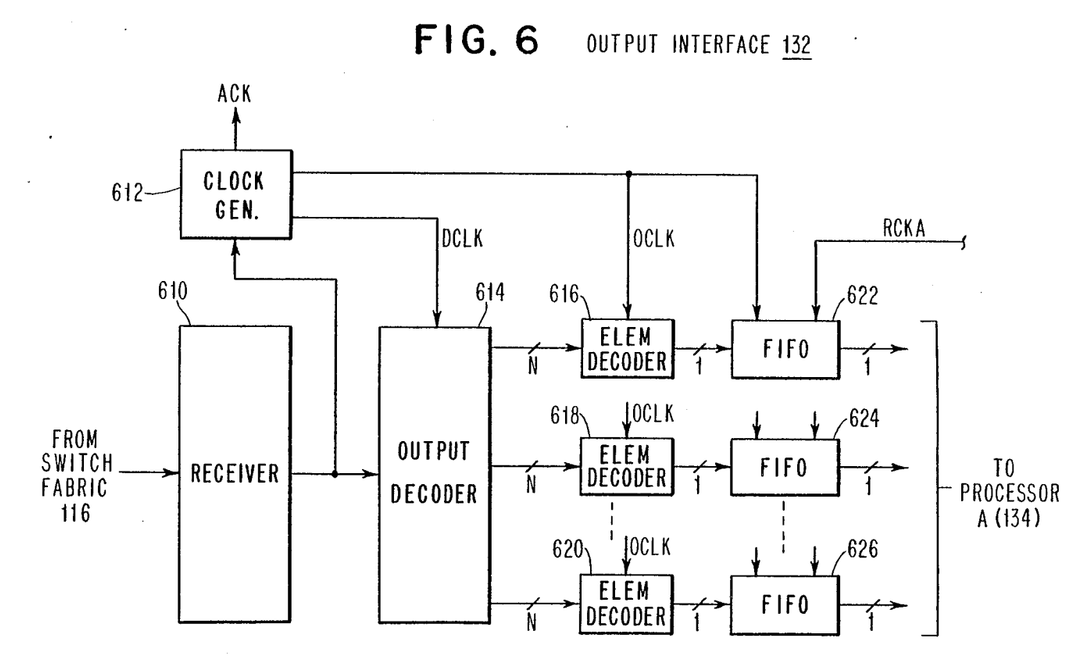
FIG. 6 is a block diagram of an output adapter suitable for use in the switching system shown in FIG. 1.

FIG. 6 is a block diagram of circuitry suitable for use as one of the output interface circuits 132, 138 or 144. The circuitry shown in FIG. 6 includes a receiver 610, an output decoder 614 and a clock generator 612 which operate identically to the corresponding circuit elements 410, 414, and 412 of the switch fabric processing channel 400, described above in reference to FIG. 4. The eight N-bit basic code values provided by the output decoder 614 are applied to respectively different elementary decoders (e.g. 616, 618 and 620). Each decoder converts the two possible code values applied to its input port to a one or a zero. For example, if the code set shown in FIG. 3B is used and the output interface shown in FIG. 6 is the output interface 132 shown in FIG. 1, then the elementary decoder 616 would decode the codewords 1111 to one and 0000 to zero the decoder 618 would decode 1010 to one and 0101 to zero: and the decoder 620 would decode 0100 to one and 0000 to zero. The bit-serial signals provided by the elementary decoders 616. 618 and 620 are applied to respective FIFO's 622, 624 and 626. Data is written into each FIFO synchronous with a signal OCLK provided by the clock generator 612 and is read from the FIFO by the destination processor input port synchronous with a clock signal RCKA provided by the destination processor input port 134.

The switching system described above is able to transfer bit-serial data streams from eight source processors to eight destination processors. In the embodiment described above, the eight source and eight destination processors were assumed to be the same. It is contemplated, however, that they may be different sets of processors. In this instance, a two-way communication link between the two sets of eight processors could be implemented using two of the one-way switching systems described above.

However, if it is desired that each of the sixteen processors be able to communicate with any of the other fifteen processors, modifications to the circuitry shown in FIGS. 1 through 6 may be desirable. Two techniques may be used to construct larger switches. The first technique is to use a larger code set and the second technique combines frequency-division multiplexing or time-division multiplexing with switch elements that use smaller codesets.

Systematic techniques for constructing large codesets are known. For example, the code set used in the system described above may be extended from eight code pairs to R code pairs for all R of the form $R=(j+2)2^{j-1}$, using methods described in a paper by S. Chang et al., "Coding for T-user Multiple Access Channels" IEEE Trans. on Information Theory, Vol. IT-25 No. 6, pp 684-691, Nov. 1979. This paper is hereby incorporated by reference. Each of these code sets has codewords of length $2^j$. In addition, the bandwidth efficiency of the code improves as the size of the code set increases. For example, in the case of R equal to eight the codewords have a length of four resulting in a bandwidth efficiency of two (eight divided by four equals 2 bits transmitted for each channel symbol). If R is equal to 256, the codewords have a length of 64 resulting in a bandwidth efficiency of 4. However, a system using a code of this length would need to distinguish from among over 200 different levels for the channel symbols. This would require very sensitive receivers in the switch fabric and output interface circuits. The sensitivity of these elements is a limiting factor on the size of the code set.

Frequency-division multiplexing may be used to increase the size of a switching system without increasing the number of levels. This method assumes that the transmission channels can accommodate carrier signals having different frequencies, for example, two different frequencies of light for an optical fiber transmission channel. Using this method in the context of the switching system described above, each input interface would send encoded messages to a first set of eight processors using light at the first frequency and would send encoded messages to a second set of eight processors using light at the second frequency. Using methods analogous to those described below in reference to time-division multiplexing, the size of the switching system may be increased in steps. In this switching system, frequency-division multiplexing techniques would replace the time-division multiplexing techniques described below.

The combination of time-division multiplexing (TDM) techniques with small code sets provides yet another method of increasing the size of the switch. In addition, this technique provides for modular growth of a switching system. A general description of the technique is presented below, followed by an example described with reference to FIGS. 7 and 8.

The basic building block of the switching system described below is an R×R switch module which uses a codeset having R code pairs. This module can be used to build an S×S switch, where S equals Q times R. This is done by first dividing the S inputs/outputs of the switching system into Q groups of R inputs/outputs each. Each of the transmission channels is then defined as having Q time slots. Time slots are assigned between groups of inputs and groups of outputs in a manner similar to the assignment of code pairs described above in reference to FIG. 5.

The general rule for this assignment may be stated as follows. Input group P, where $1 \leq P \leq Q$, uses 25 time slot j to transmit data to group T, $1 \leq T \leq Q$, where:

$$j = [(P+T-2) \bmod Q] + 1 \tag{1}$$

All input groups are active in all time slots, but each time slot is used to transmit data to a different output group. An example of an expanded switching system of this type is shown in FIG. 7.

Figure 7:
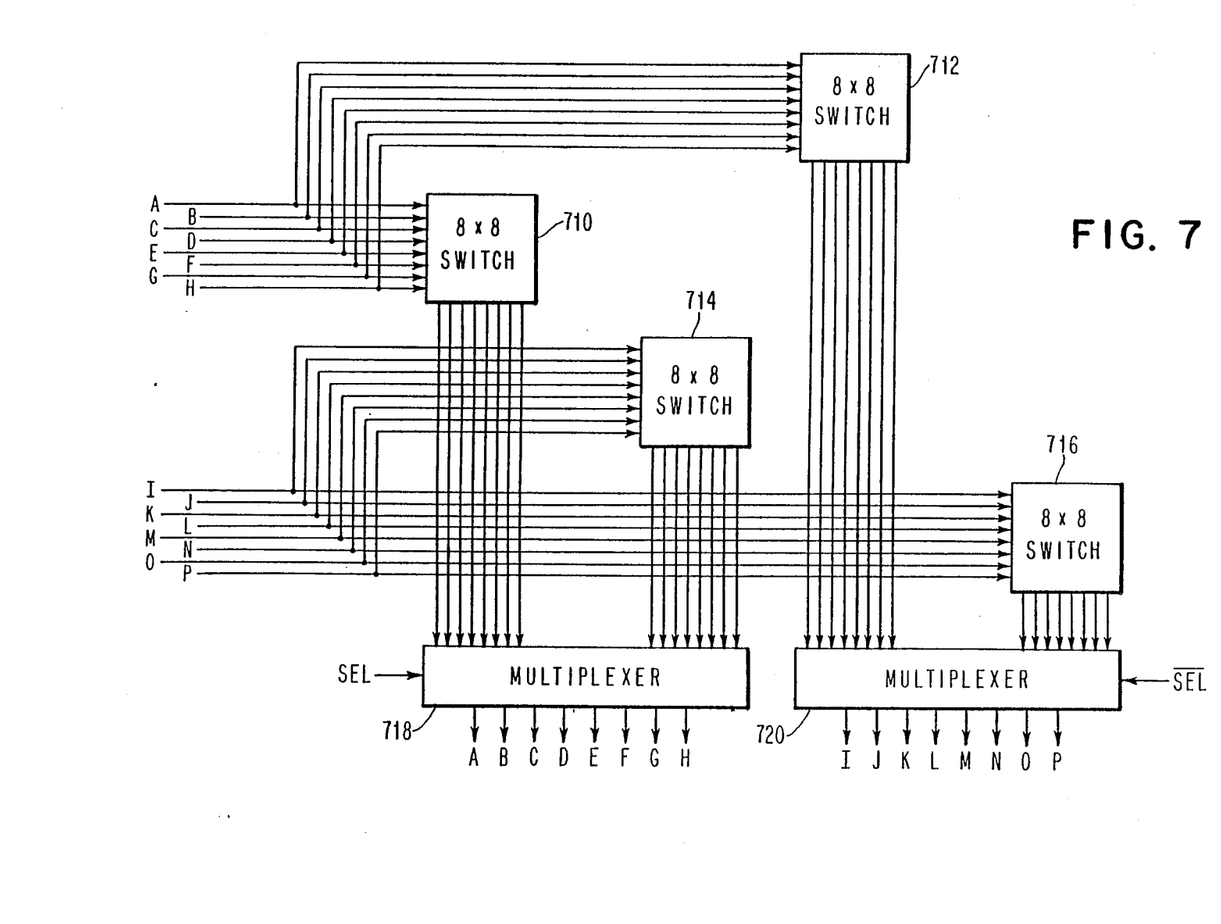
FIG. 7 is a block diagram of an extension of the switching system shown in FIG. 1 which handles 16 processors.

In FIG. 7, a sixteen by sixteen switch is made from four eight by eight switches, 710, 712, 714 and 716. Sixteen processors labeled A through P are coupled to the switching system. The eight output ports (not shown) of the processors A through H are coupled to the respective eight input interface circuits (not shown) internal to each of the switches 710 and 712. In the same manner, the eight output ports of the processors I through P are coupled to the eight input interfaces internal to the switches 714 and 716.

The output interfaces of the switches 710 and 714 are coupled to respectively different sets of input terminals of a multiplexer 718 and the output interfaces of the switches 712 and 716 ar Ⓡcoupled to respectively different sets of input terminals of a multiplexer 720. The multiplexer 718 is conditioned by a signal SEL to pass signals from the switches 710 and 714 alternately, during respective first and second time periods. In the same way, the multiplexer 720 is conditioned by the signal $\overline{\text{SEL}}$ to pass the signals from the switches 716 and 712 during the respective first and second time periods. Thus, during the first time periods, the multiplexers 718 and 720 pass data from processors A to H and I to P to the respective processors A to H and I to P. During the intervening second time periods, however, the multiplexers 718 and 720 pass data from processors A to H and I to P to the respective processors I to P and A to H.

While the switches 710, 712, 714 and 716 shown in FIG. 7 are complete eight-by-eight switches such as the one shown in FIG. I, it is contemplated that a similar construction using only the switch fabric section for the switches 710, 712, 714 and 716 can be made to produce the same switching function. In this alternative construction (not shown), the inputs A through H of the switches 710 and 712 and the inputs I through P of the switches 714 and 716 would be the transmission channel outputs of input interface circuitry coupled directly to the respective processors A through P. In addition, the multiplexers 718 and 720 would be replaced by couplers (not shown) which would combine the signals provided by the respective output transmission channels of the switches 710 and 714 and of the switches 712 and 716 into two groups of eight signals each. The switching function performed by the multiplexers 718 and 720 would be changed to a routing function inherent in the selected code set. An exemplary code set for use with this modified switch is shown in FIG. 8.

Figure 8:
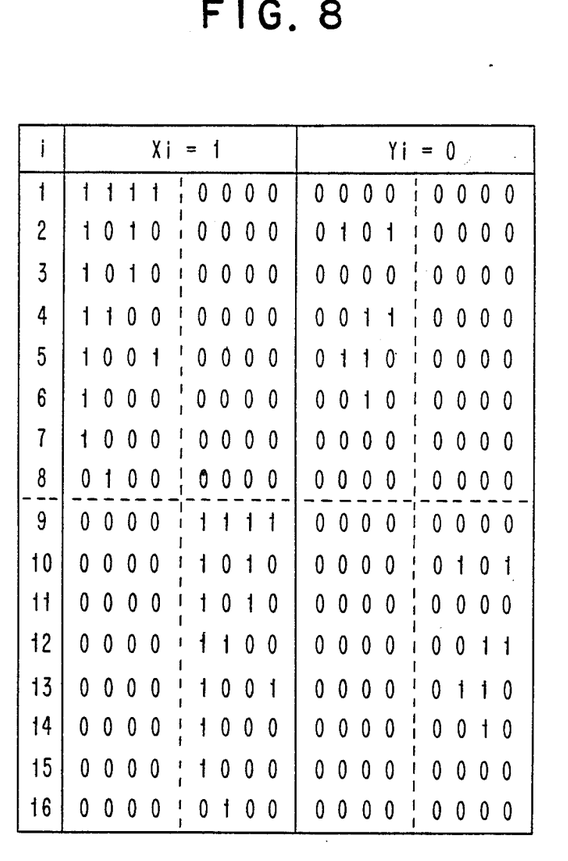
FIG. 8 is a table illustrating a code suitable for use by input adapters used in a switching system which handles 16 processors.

The code set shown in FIG. 8 uses eight-bit code words formed by concatenating four zeros to each code value in the code table shown in FIG. 3B. Zeros are concatenated to the end of each code word in the top half of the table and to the beginning of each codeword in the bottom half of the table. As set forth above, in reference to FIG. 3A, this type of construction is essentially a time-division multiplexing of the switch channel.

It is contemplated that the techniques of using larger codesets, frequency-division multiplexing and time-division multiplexing may be combined as appropriate to generate switching systems of varying sizes.

The invention described above provides performance advantages over other interprocessor switching systems since data may be conveyed among all processors connected to the switch without delays caused by lack of an available path and without overhead for a switch controller. In addition, the data are transmitted and received without extensive arithmetic calculations. Consequently, the described invention is an efficient high-speed switching system suitable for interprocessor communication in a multiprocessor environment.

Those skilled in the art will recognize that, while the invention has been described in terms of a preferred embodiment, the invention may be practiced as outlined above with modifications within the spirit and scope of the appended claims.

The invention claimed is:

1. A method of routing data items provided by a plurality of source nodes to a plurality of destination nodes, comprising the steps of:
    A. assigning basic code values to each data item provided by each of said plurality of source nodes, where the code values indicate the desired destination node of each of said data items;
    B. combining the basic code values representing data items provided by each of said plurality of source nodes to generate a respective plurality of sets of channel symbols;
    C. separating said plurality of sets of channel symbols into their respective constituent basic code values;
    D. associating the separated basic code values indicating predetermined ones of said plurality of destination nodes to form a plurality of groups of basic code values, wherein the basic code values within each group of said plurality of groups indicate a common destination node; and
    E. decoding each code value in each of said plurality of groups of basic code values to recover the data items directed to the respective destination nodes by each of the source nodes.

2. The method of routing data set forth in claim 1 wherein each of said data items represents one of a first value and a second value and the step A comprises, encoding the data items produced by a predetermined source node and destined for said plurality of destination nodes with a respective plurality of pairs of N-bit binary basic code values, one code value of each of said pairs being assigned when said data item has said first value and the other code value of the pair being assigned when said data item has said second value, wherein said plurality of pairs of N-bit binary values define a multiple access code for an additive channel.

3. The method of routing data set forth in claim 2, wherein the step B comprises the steps of:
    converting said plurality of assigned code values into a respective plurality of N-bit bit-serial signals;
    converting said plurality of N-bit bit-serial signals into a respective plurality of sequences of N analog values;
    and additively combining said plurality of sequences of analog values to generate said plurality of sequences of channel symbols.

4. The method of routing data set forth in claim 1 wherein:

said step B includes the steps of:

additively combining the basic code values representing data items provided by each of said plurality of source nodes to generate said respective plurality of sets of channel symbols; and transmitting said plurality of sets of channel symbols via a respective plurality of data transmission channels;

said step C includes the steps of:

receiving said plurality of sets of channel symbols via said plurality of data transmission channels; and separating said received plurality of sets of channel symbols into their respective constituent basic code values; and said step D includes the steps of:

associating the separated basic code values indicating each of said plurality of destination nodes to form respective groups of basic code values, wherein each respective code value in a group of said plurality of groups of basic code values indicates a respectively different source node;

additively combining the code values in each of said groups of basic code values to generate further sets of channel symbols;

transmitting said further sets of channel symbols via respective further transmission channels;

receiving each of said further sets of channel symbols via said respective further transmission channels; and separating said further sets of channel symbols into said respective plurality of groups of basic code values.

5. The method of routing data set forth in claim 3, wherein plurality of source nodes includes K source nodes and said plurality of sets of channel symbols includes K sets, each set containing N channel symbols where N and K are integers and N is not greater than K.

6. The method of routing data set forth in claim 5, wherein K equals eight and N equals four.

7. A data communications network for routing data items provided by a plurality of source nodes to a plurality of destination nodes, comprising:

encoding means for encoding each data item provided by each of said plurality of source nodes to indicate the value of the data item and a desired destination node for the data item;

combining means, coupled to said encoding means, for combining the encoded data items provided by each one of said plurality of source nodes to generate a respective plurality of sequences of channel symbols;

separating means, coupled to said combining means, for separating said plurality of sequences of channel symbols into their respective constituent encoded data items:

grouping means, coupled to said separating means, for associating ones of said encoded data items indicating a predetermined one of said plurality of destination nodes to form a group of encoded data items, wherein each encoded data item in said group of encoded data items indicates a respectively different source node;

decoding means for decoding said group of encoded data items to recover data items directed to said predetermined one of said plurality of destination nodes by each one of said plurality of source nodes.

8. The data communications system set forth in claim 7, further comprising:

a plurality of data transmission means coupled for conveying said respective plurality of sequences of channel symbols from said combining means to said separating means;

further combining means, coupled to said grouping means, for combining the encoded data items in said group of encoded data items to generate a further sequence of channel symbols;

further data transmission means coupled to said further combining means for conveying said further sequence of channel symbols;

further separating means, coupled to receive said further sequence of channel symbols from said further data transmission means, for regenerating said group of encoded data items therefrom and for providing said regenerated group of encoded data items to said decoding means.

9. The data communications system set forth in claim 7 wherein:

each of said data items may represent one of first and second values;

each of said plurality of encoding means includes means for applying the data items provided by a predetermined one of said source nodes and destined for said plurality of destination nodes to a plurality of data encoders, respectively, wherein each of said plurality of data encoders uses a respectively different pair of code values from a code set to encode the respective first and second values of said data items;

each of said plurality of combining means includes means for additively combining the encoded data items produced by the plurality of data encoders of the respective encoding means to generate one of said plurality of sequences of channel symbols.

10. The data communications network set forth in claim 9, wherein:

the code sets used by each of said plurality of encoding means are respectively different permutations of a basic code set; and said basic code set is a multiple access code for an additive channel.

* * * * *